United States Patent [19]
Johns

[11] Patent Number: 4,821,285
[45] Date of Patent: Apr. 11, 1989

[54] THERMOCOUPLE SELECTION SWITCH

[75] Inventor: Robert H. Johns, Natrona Heights, Pa.

[73] Assignee: Allegheny Ludlum Corporation, Pittsburgh, Pa.

[21] Appl. No.: 132,303

[22] Filed: Dec. 15, 1987

[51] Int. Cl.$^4$ .................. G01K 01/12; G01K 13/00
[52] U.S. Cl. .................................. 374/152; 136/234; 266/99; 337/298; 374/167; 374/139
[58] Field of Search ............... 374/139, 179, 152; 136/234; 266/99; 337/300, 298

[56] References Cited

U.S. PATENT DOCUMENTS

| | | | |
|---|---|---|---|
| 2,397,901 | 4/1946 | Zimmerman | 374/139 X |
| 3,812,716 | 5/1974 | McIntyre | 374/179 X |
| 3,946,610 | 3/1976 | Sartorius | 374/139 X |
| 3,974,993 | 8/1976 | Hammecke | 337/300 X |
| 3,998,549 | 12/1976 | Pusch et al. | 374/129 X |
| 4,483,631 | 11/1984 | Kydd | 374/179 X |

Primary Examiner—Daniel M. Yasich
Attorney, Agent, or Firm—Patrick J. Viccaro

[57] ABSTRACT

A thermocouple selection switch for monitoring thermocouples positioned within tunnel furnace cars allows a plurality of thermocouples to be monitored, while, at the same time, avoiding the requirement of precisely aligning the tunnel furnace car with an external probe. The selection switch is comprised of a plurality of switch stations, each of which contain longitudinally extending contact rails which when contacted with an external probe at any point along the length of the contact rails establishes electrical contact with opposite sides or wires of thermocouple.

11 Claims, 2 Drawing Sheets

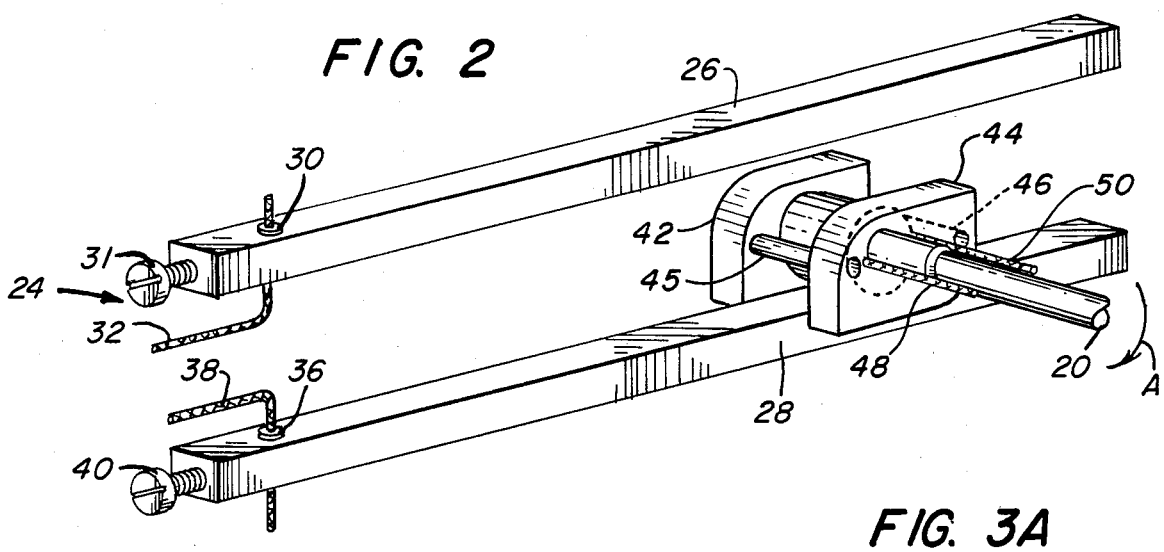
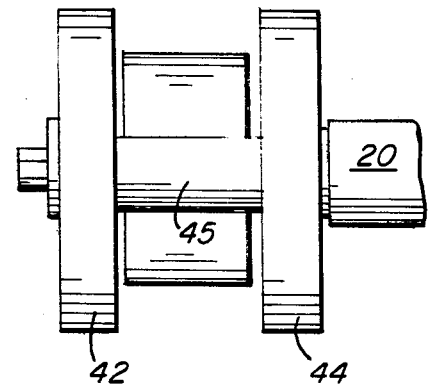
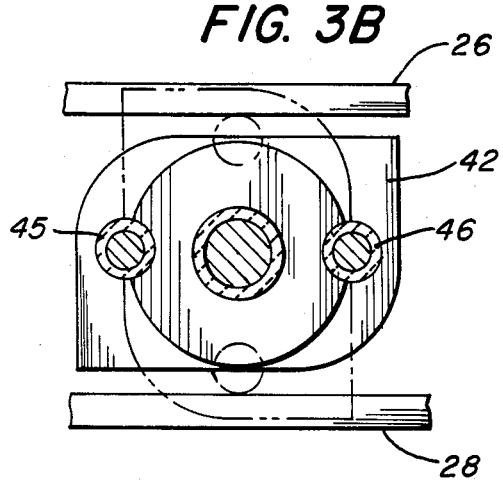
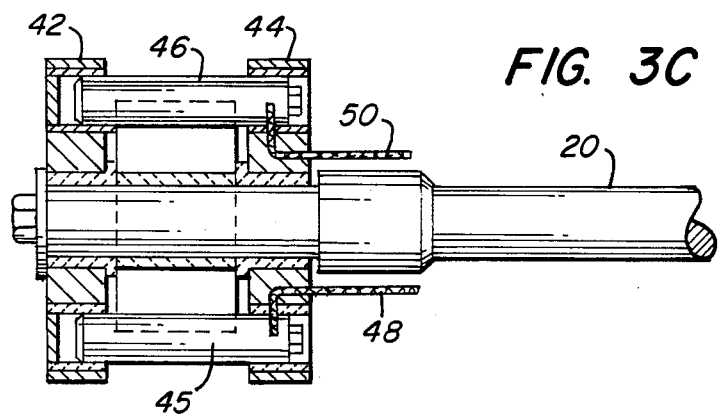

THERMOCOUPLE SELECTION SWITCH

BACKGROUND OF THE INVENTION

1. Field of the Invention

The present invention relates generally to switching apparatus, and, more particularly, to a thermocouple selection switch for monitoring thermocouples positioned within tunnel furnace cars.

2. Description of the Prior Art

In the processing of various metal products, heat treating furnaces are required to allow treatments such as annealing, hardening, tempering, carburizing, and stress relieving of the metal stock. For these treatments, the furnaces are operated at temperatures ranging from several hundred degrees Fahrenheit to temperatures close to two thousand degrees. Critical to the success of the heat treatment is the maintenance of a uniform temperature in the furnace to allow even heating of the metal stock.

One example of a heat treating furnace is a tunnel furnace. In such a furnace, the stock to be heated, such as metal coils, is placed inside a series of furnace cars which are pushed slowly in a sequential manner through the furnace. As the furnace fills with these cars, insertion of additional furnace cars into the furnace causes the first cars inserted into the furnace to be pushed out of the furnace.

To ensure that the stock is uniformly heated, the temperature within the individual furnace cars is periodically tested. Thermocouples are mounted within the furnace cars to allow this interior temperature to be determined. Thermocouples are typically positioned above or beneath the metal stock in the furnace cars, and periodic readings of these thermocouples allow temperature profiles of the metal stock to be compiled.

Sidewall fixtures positioned along the sidewalls of the tunnel furnace shell allow an external probe to be inserted therethrough to connect with the thermocouples in order to obtain readings from the thermocouples. The connection to the thermocouples is accomplished by a conventional plug-in connection with the external probe having a plug positioned at the end thereof and a mating socket mounted beneath the furnace car.

Such a means of connection with the thermocouples requires the individual furnace cars to be precisely aligned with the probe. Oftentimes, however, readings are attempted when the furnace car is misaligned with the probe. Such a misalignment at times precludes an electrical connection with the thermocouples, or, results in damage to the probe and/or the mating socket on the furnace car.

It is therefore the object of the present invention to provide a means for connecting an external probe to a thermocouple positioned within a tunnel furnace car while not requiring the car to be precisely positioned relative to the probe.

It is a further object of the present invention to provide a thermocouple selection switch to allow the monitoring of any of a plurality of thermocouples positioned within a tunnel car.

SUMMARY OF THE PRESENT INVENTION

In accordance with the present invention, a thermocouple selection switch is disclosed for monitoring thermocouples positioned within tunnel furnace cars. The selection switch includes a longitudinally extending first contact rail means mounted to a tunnel furnace car, and a longitudinally extending second contact rail means positioned therebeneath at a predetermined minimum spacing from the first contact rail means and in an aligned relationship therewith. The first contact rail means is electrically coupled to first sides of thermocouples, and the second contact rail means is electrically coupled to second sides of the thermocouples. In the preferred embodiment, the first contact rail means is comprised of a plurality of spaced apart contact rails with each of the contact rails being electrically coupled to a first side of a thermocouple, and the second contact rails means is also comprised of a plurality of contact rails, each of which is coupled to a second side of a thermocouple. The contact rails of the first contact rail means may, for example, be supported beneath a plate means, and the contact rails of the second contact rail means may be mounted upon a second plate means.

A support means maintains the second contact rail means at the predetermined spacing, and may be comprised of corner support rods for positioning at corner portions of the first and second plate means to maintain the plate means, and the contact rails at the predetermined spacing. The support rods may be of first diameters at upper portions thereof and enlarged second, diameters at lower portions thereof, thereby allowing the first plate member to slidably engage with the upper portions of the corner support rods, and the second plate to be fixedly attached beneath the corner support rods. This arrangement permits slight upward travel of the first plate; effectively acting, owing to the physical weight of the first plate and its assembled members, as a spring loaded receptical for more efficient electrical contact with an external mating contacting means.

A connecting means is positioned at a tip portion of connecting probe for electrically connecting the first and the second contact rail means, respectively, to monitor located externally of the furnace when the tip portion of the external connecting probe is positioned between the first contact rail means and the second contact ail means and caused to make electrical to contact with the first and the second contact rail means along the lengths thereof such as by rotating the probe. The connecting means may be comprised of a first contact pin and a second contact pin disposed at opposite sides of a tip portion of the connecting means and separated by a distance slightly greater than the spacing between the first contact rail means and the second contact rail means.

In one embodiment of the present invention, the thermocouple selection switch includes a top plate fixedly attached to a bottom portion of a tunnel car, a bottom plate positioned beneath the top plate and separated therefrom by a set distance, and a support means for supporting a bottom plate at the set distance from the top plate. A floating plate is positioned intermediate of the top plate and the bottom plate with the floating plate being supported by the support means so as to maintain a separation distance from the bottom plate of at least a certain amount. A plurality of spaced apart longitudinally extending first contact rails are attached to a bottom surface of the floating plate with each of the first contact rails being electrically coupled to a first side of the thermocouple. A plurality of spaced apart, longitudinally extending, second contact rails are attached to an upper surface of the bottom plate, with the second contact rails corresponding in number to the first contact rails and positioned in aligned relationship thereto, each of the first contact rails being electrically coupled to a second side of a thermocouple to thereby create a plurality of switch stations. A connecting means is positioned at a tip portion of an external connecting probe having a first contact pin and the second contact pin disposed at opposite sides of the tip portion of the connecting means and separated by a distance slighter greater than the separation distance between the floating plate and the bottom plate s that rotation of the probe allows effective spring loaded electrical contact between the first contact pin and a first contact rail, and between a second contact pin and a second contact rail.

BRIEF DESCRIPTION OF THE DRAWINGS

The present invention will be better understood when read in light of the enclosed drawings in which:

FIG. 2 is a schematic illustration of one switch station of the thermocouple selection switch of the present invention further illustrating the connecting means positioned at the end of an external probe;

FIGS. 3A-3C are side, end, and top views of the connecting means of the present invention, respectively.

DESCRIPTION OF THE PREFERRED EMBODIMENT

Figure 1:
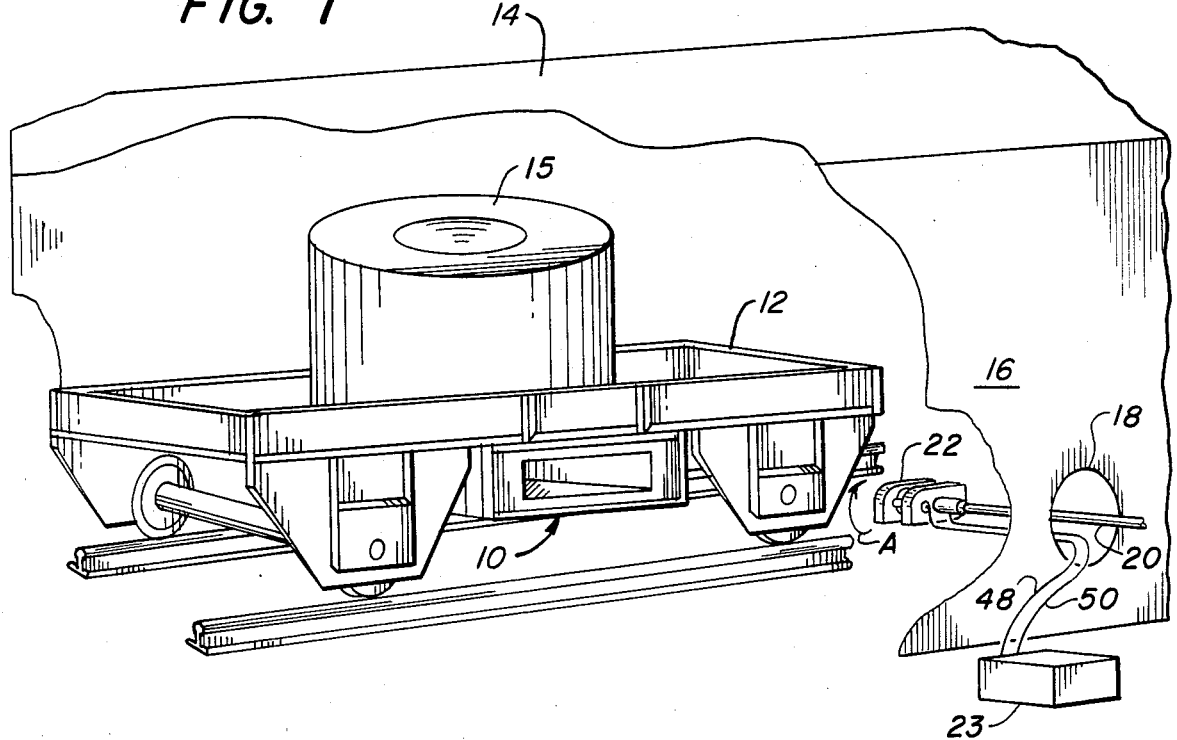
FIG. 1 is a schematic illustration of the thermocouple selection switch of the present invention positioned beneath a tunnel furnace car in a tunnel furnace.

Referring now to the schematic illustration of FIG. 1, there is illustrated the thermocouple selection switch 10 of the present invention mounted beneath a tunnel furnace car 12 positioned in tunnel furnace 14. Car 12 carries a coil 15 of metal strip. The shell structure of furnace 14 includes side wall 16 having fixtures, such as fixture 18 positioned therealong. Fixture 18 contains a cavity extending into the interior of the furnace to allow an external connecting probe 20 to be inserted therethrough and into the interior of the furnace 14. Positioned at the tip portion of probe 20 is probe tip assembly 22 which functions as a connecting means and which also comprises a portion of the present invention. Tip assembly 22 is rotated in a direction indicated by arrow A (FIGS. 1 and 2) which allows the probe 20 to be electrically coupled to switch 10 or, decoupled from switch 10 in a unique manner to thereby allow monitoring of thermocouples mounted inside the furnace car 12.

Illustrated in FIG. 2 is a single switch station, referred to generally as 24, of selection switch 10 the the present invention. In the preferred embodiment, switch 10 includes a plurality of switch stations 24. Switch station 24 is comprised of a first longitudinally extending contact rail 26 and a second longitudinally extending contact rail 28 positioned therebeneath in an aligned relation and separated by a predetermined minimum distance. Contact rails 26 and 28 are comprised of an electrically conductive material and are at least several inches in length. Cavity 30 extending through first contact rail 26 allows electrical connection with wire 32 which leads to a first side of a thermocouple. Wire 32 is affixed to contact rail 26 by contact screw 31. Similarly, cavity 36 extending through second contact rail 28 allows contact rail 28 to be electrically coupled wire 38 which leads to a second side of a thermocouple. Wire 38 may similarly be affixed to contact rail 28 by contact screw 40. Other means for affixing the wires 32 and 38 to the contact rails may, of course, be alternatively utilized. Conventional thermocouples may be used, such as one having a first side composed of Ni and Mo bimetal and a second side composed of Ni.

Also illustrated in FIG. 2, and additionally in FIGS. 3A-3C, is the probe tip assembly 22 of external probe 20. A first key plate 42 is positioned at the tip of assembly 22 forms a first side of assembly 22. A second key plate 44, separated from key plate 42 by a distance slightly greater than the width of contact rails 26 and 28, forms a second side of tip assembly 22. Both key plates 42 and 44 are electrically nonconductive and may, for example, be comprised of transite or fiberglass composite board. Electrically conductive contact pins 45 and 46 span the gap between key plates 42 and 44. The heights of key plates 42 and 44 are less than the separation distance maintained between contact rails 26 and 28 to allow tip assembly 22 to be positioned therebetween. Contact pins 45 and 46 are electrically coupled to wires 48 and 50, respectively. Wires 48 and 50 extend along the length of external probe 20 to the exterior of tunnel furnace 14 to allow connection with monitoring apparatus. By rotating external probe 20, contact pin 44 is caused to contact with first contact rail 26 and contact pin 45 is caused to contact with second contact rail 28, thereby allowing wires 32 and 38, and, in turn, each thermocouple side to be electrically connected to the monitor apparatus 23.

Figure 4:
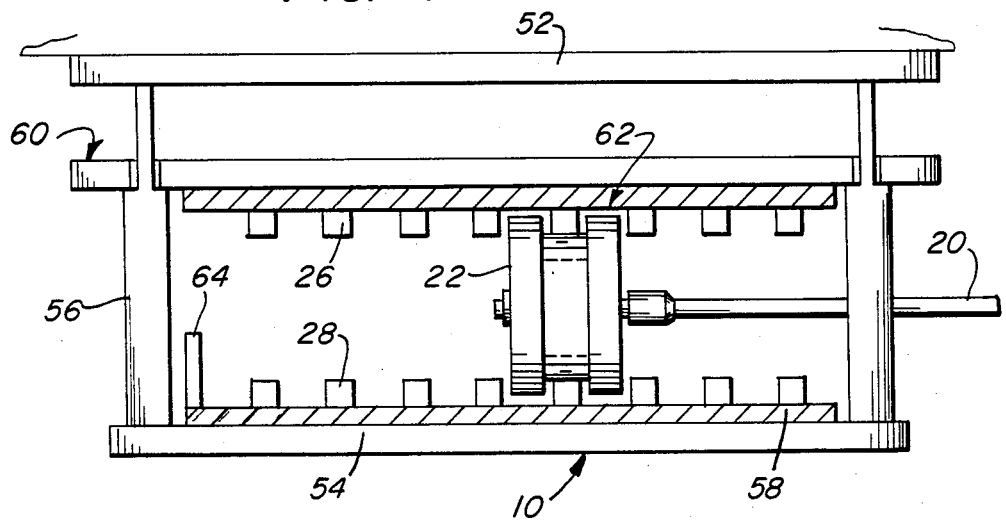
FIG. 4 is a side, elevational view of the preferred embodiment of the thermocouple selection switch of the present invention.

Referring now to the side, elevational view of FIG. 4, there is illustrated the preferred embodiment of the present invention in which a plurality of switch stations 24 are combined to form thermocouple selection switch 10. Selection switch 10 includes a switch body comprised of top plate 52, bottom plate 54, and support and separating means 56. As shown, support and separating means 56 is comprised of four corner supports,. attached to the four corner portions of top plate 52 and bottom plate 54, respectively. Support and separating means 56 maintains bottom plate 54 at a fixed distance from top plate 52. Top plate 52 is affixed by any conventional connecting means to the bottom of furnace car 12. Mounted upon bottom plate 54 is an electrical and thermal insulation board 58. Positioned upon insulation board 58 are a plurality of longitudinally extending second contact rails 28 of the plurality of switch stations 24. Each of plurality of contact rails 28 are spaced apart from each other and extend in parallel directions.

Located between top plate 52 and bottom plate 54 is floating plate 60. Floating plate 60 is supported by support means 56 such that a minimum separation distance is maintained between the floating plate 60 and bottom plate 54. However, floating plate 60 is permitted upward movement so that the separation between plate 60 and plate 54 may be increased. Similar to electrical and thermal insulation board 58 mounted upon bottom plate 54 is a second electrical and thermal insulation board 62. Attached to and positioned beneath insulation board 62 is a plurality of first contact rails 26 of the plurality of switch stations 24. Contact rails 26 correspond in number and spacing with the contact rails 28. For purposes of illustration only, FIG. 4 illustrates a switch 10 containing eight switch stations 24. Switch 10 may, alternatively, contain a greater or a lesser number of switch stations 24. Each contact rail 26 and 28 of each switch station 24 has coupled thereto a wire 32 or 38, each leading to a first or a second side of a thermocouple. In the embodiment of FIG. 4 containing eight switch stations 24, a total of eight thermocouples could be monitored.

Further included in the preferred embodiment of FIG. 4 is index stop 64 mounted upon insulation board 58 and extending in a direction parallel to the direction of the contact rails 28. Index stop 64 is positioned at the back portion of the switch body.

In operation, the thermocouple selection switch 10 of the preferred embodiment illustrated in FIG. 4 allows the monitoring of a plurality of thermocouples mounted within the furnace car 12 while avoiding the prior art requirement of precisely aligning the furnace car 12 at a side wall fixture 18 of the furnace. Because electrical contact with a thermocouple may be made by contacting any point along the length of the contact rails 26 and 28, the furnace car only needs to be in vicinity of the side wall fixture 18. When a furnace car 12 is suitably positioned at or near fixture 18, external probe 20 having tip assembly 22 can be inserted manually by operating personnel 18 to contact with the switch 10. Probe 20 is translated by operating personnel such that the tip 22 is inserted into the gap separating contact rails 26 and 28. Translation of probe 20 continues until key plate 42 strikes index stop 64. Index stop 64 is positioned at a distance from contact rail 28 of a first switch station 24 so that positive alignment may be made with the first contact rails of the switch station 24. Probe 20 is then rotated by the operating personnel allowing contact pins 45 and 46 to contact with contact rails 26 and 28, respectively, if rotated 90 degrees clockwise. Contact with the respective contact rails 26 and 28 is maintained to allow temperature stabilization between wires 48 and 50 and the connected through wires 32 and 38 at which time accurate reading of a thermocouple associated with a first switch station 24 may be obtained. In a similar manner, readings corresponding to thermocouples connected to subsequent switch stations 24 may also be obtained by withdrawing the external probe incrementally consistent with corresponding rail spacing.

While the present invention has been described in connection with the preferred embodiment of the various figures, it is to be understood that other similar embodiments may be used or modifications and additions may be made to the described embodiment for performing the same function of the present invention without deviating therefrom. Therefore, the present invention should not be limited to any single embodiment but rather construed in breadth and scope in accordance with the recitation of the appended claims.

What I claim is:

1. A thermocouple switch for monitoring thermocouples positioned within tunnel furnace cars, said thermocouple switch including:
   longitudinally extending first contact rail means mounted to a tunnel furnace car, said first contact rail means being electrically coupled to first sides of thermocouples carried by said tunnel furnace car;
   longitudinally extending second contact rail means positioned beneath said first contact rail means at a predetermined minimum spacing therefrom and in an aligned relationship therewith, said second contact rail means being electrically coupled to second sides of the thermocouples carried by said tunnel furnace car;
   support and separating means for maintaining the first contact rail means at the predetermined minimum spacing from the first contact rail means; and
   connecting means positioned at a tip portion thereof for establishing electrical contact with the first and the second contact rail means along the lengths thereof thereby allowing monitoring of one of said thermocouples externally of said tunnel furnace car.

2. The thermocouple switch of claim 1 wherein said first contact rail means includes a plurality of spaced apart contact rails with each of the contact rails being electrically coupled to first sides of thermocouples.

3. The thermocouple switch of claim 2 further including a first plate means to allow the plurality of contact rails to be mounted thereunder.

4. The thermocouple switch of claim 3 wherein said second contact rail means includes a plurality of spaced apart contact rails with each of the contact rails being electrically coupled to second sides of thermocouples.

5. The thermocouple switch of claim 4 further including a second plate means to allow the plurality of contact rails to be mounted thereto.

6. The thermocouple switch of claim 5 wherein said support and separating means includes corner support rods for positioning at corner portions of the first and second plate means, respectively, to maintain the plate means, and therefore, the contact rails, at the predetermined minimum spacing.

7. The thermocouple switch of claim 6 wherein said corner support rods are fixedly attached to corners of the second plate means.

8. The thermocouple switch of claim 7 wherein said corner support rods are of first diameters at upper portions thereof and of enlarged second diameters at lower portions thereof.

9. The thermocouple switch of claim 8 wherein said first plate means slidably engages with the upper portions of the corner support rods.

10. The thermocouple switch of claim 1 wherein said connecting means includes a first contact pin and a second contact pin, said first and second contact pins being disposed at opposite sides of the tip portion of said probe and separated by a distance slightly greater than spacing between the first contact rail means and the second contact rail means.

11. A thermocouple selection switch for monitoring thermocouples positioned within tunnel furnace cars, said thermocouple selection switch including:
   a top plate fixedly attached to a bottom portion of a tunnel furnace car;
   a bottom plate positioned beneath said top plate and separated therefrom by a set distance;
   support means for supporting the bottom plate at the set distance from the top plate;
   a floating plate positioned intermediate of the top plate and the bottom plate, said floating plate being supported by the support means so as to maintain a minimum set separation distance from the bottom plate;
   a plurality of spaced apart longitudinally extending first contact rails attached to a bottom surface of the floating plate with each of said first contact rails being electrically coupled to a first side of different ones of thermocouples carried by said tunnel furnace car;
   a plurality of spaced apart, longitudinally extending second contract rails attached to an upper surface of the bottom plate, said second contact rails corresponding in number to the first contact rails and positioned in an aligned relationship thereto, each of said first contact rails being electrically coupled to a second side of different ones of thermocouples carried by said tunnel furnace car; and a probe having a tip portion including connecting means comprised of a first contact pin and a second contact pin disposed at opposite sides of said tip portion and separated by a distance slightly greater than the separation distance between said floating plate and said bottom plate for establishing electrical contact between aligned ones of said first contact rails and said second contact rails by rotating said probe.

* * * * *